United States Patent [19]

Clifford

[11] Patent Number: 4,900,104
[45] Date of Patent: Feb. 13, 1990

[54] PRESSURE MODULATION VALVE

[76] Inventor: Gary Clifford, 1601 NW. 38th Ave., Lauderhill, Fla. 33311

[21] Appl. No.: 101,809

[22] Filed: Sep. 28, 1987

[51] Int. Cl.$^4$ ............................ B60T 8/42; B60T 8/02
[52] U.S. Cl. .................................. 303/115; 303/119; 251/129.15
[58] Field of Search .............. 303/115, 113, 114, 116, 303/117, 118, 119, 71, 61; 251/129.15, 324, 319; 188/181 A

[56] References Cited

U.S. PATENT DOCUMENTS

| | | | |
|---|---|---|---|
| 3,679,270 | 7/1972 | Jania | 188/181 A |
| 3,851,930 | 12/1974 | Grosseau | 188/181 A |
| 3,880,476 | 4/1975 | Belart et al. | 303/71 |
| 4,083,609 | 4/1978 | Cochran | 303/113 |
| 4,121,872 | 10/1978 | Burgdorf et al. | 303/115 |
| 4,670,271 | 6/1987 | Pasternak | 426/90 |
| 4,756,391 | 7/1988 | Agarwal et al. | 303/100 |

FOREIGN PATENT DOCUMENTS

| | | | |
|---|---|---|---|
| 2230084 | 12/1972 | Fed. Rep. of Germany | 303/115 |
| 453106 | 5/1968 | Switzerland | 303/61 |

Primary Examiner—Robert J. Oberleitner
Assistant Examiner—Mark T. Le
Attorney, Agent, or Firm—Melvin K. Silverman

[57] ABSTRACT

A fluid pressure modulation valve, particularly adapted for use within an anti-lock brake system, includes a housing having a fluid inlet port for force input, an outlet port for force output, and an axial channel in fluid communication with inward apertured ends of both the inlet and outlet ports. Further provided is a piston which is radially centered about and secured to a piston rod; the piston is slideably mounted within the axial channel, wherein the piston and piston rod possess an axial range of travel extending from downstream of the apertured end of the outlet port. The piston and piston rod are fluidly sealed within the axial channel at both the upstream and downstream ends. At the upstream end, the piston rod extends beyond the upstream fluid seal. Disposed within the inlet port, outlet port, and the connecting axial channel is a fluid, such as a hydraulic liquid. Yet further provided is a linear motor for the selective reciprocation of the extending upstream and of the piston rod responsive to external control signals applied to the linear motor. The movement of the piston relative to the apertured end of the outlet port will operate to modulate the pressure outlet therefrom responsive to the electrical input to the linear motor.

4 Claims, 3 Drawing Sheets

4,900,104

1

PRESSURE MODULATION VALVE

BACKGROUND OF THE INVENTION

The present invention relates to a fluid pressure modulation valve having particular application as a part of an anti-lock, anti-skid maximum effective braking force, hydraulic brake system. The invention, more particularly, relates to a modulator adapted for installation fluidly intermediate between an automobile's master cylinder and a vehicle wheel brake actuator to achieve linear control of brake pressure to the wheels of the automobile that is responsive to selective sensed wheel conditions.

It has been previously recognized in the prior art that the application of a braking force for the slowing of rotation of a rotating wheel is subject to a phenomenon known as wheel locking. In the automotive context, such locking will occur when the rolling friction between the wheel and the road surface is overcome and, thereupon slipping of the auto wheel relative to the road surface occurs. The dangers inherent in such locking are well known, and includes the loss of steering control, skidding, reduced effective braking force and loss of directional stability of the vehicle.

Approaches intended to deal with the above problem have appeared in the prior art and, as best known to the inventor, are represented by U.S. Pat. Nos. 3,837,711 (1974) to Van House et al, entitled Anti-Brake Pressure Modulator; No. 3,880,476 (1975) to Belart et al, entitled Electromagnetic Valve; No. 4,068,904 (1978) to Blomberg et al, entitled Anti-locking Brake Apparatus and Method; and No. 4,070,069 (1978) to Belart et al, entitled Brake Control Arrangement For Hydraulic Brake Control Systems.

None of the prior art known to the inventor, with the exception of Van House above, makes use of the selective positioning of a piston/piston rod within a hydraulic cylinder to alter the available force outputted from the master cylinder and applied to the brake.

The present invention is accordingly a direct improvement of Van House in that the structure and method of the inventor set forth below defines a suitable modulation and force output control achievable with the use of a smaller reciprocating input force and in addition the instant invention is more adaptable to construction in smaller dimensions, as is necessary to effectively apply the principles embodied in the subject invention to a practical anti-locking brake system.

SUMMARY OF THE INVENTION

The present invention constitutes a fluid pressure modulation valve, the valve comprising a housing having a fluid inlet port adapted for force input, a fluid outlet port adapted for force output, and an axial channel in fluid communication with radially inwardly apertured ends of both said inlet and outlet ports. Further provided is a piston radially centered about and secured to a part of a piston rod, said piston slideably mounted within said axial channel, said piston and piston rod having an axial range of travel extending from downstream of said apertured end of said outlet port to slightly downstream of said apertured end of said inlet port, said piston rod being fluidly sealed in said axial channel at the upstream and downstream ends thereof, in which said rod extends beyond upstream and downstream fluid seals within said axial channel. Hydraulic fluid is disposed substantially within said axial channel.

2

Yet further provided are means, in the nature of a linear motor, for selectively reciprocating said extending ends of said piston rod responsive to external control signals, relative to brake and wheel conditions, applied to said reciprocating means.

By virtue of the above arrangement, movement of said piston by said reciprocating means will block the normal fluid flow from inlet to outlet and will co-act with said fluid to increase the volume of hydraulic fluid available to said outlet port, this thereby allowing for fluid displacement available to said outlet port and, concurrently, said reciprocating means will directly oppose the fluid-transmitted force applied from said inlet port through said axial channel, in which both of said effects will act to reduce the fluid pressure and resultant force, evidenced at said outlet port.

It is accordingly an object of the present invention to provide a modulating valve adapted for use in an anti-locking, anti-skid hydraulic brake system.

It is another object to provide a hydraulic brake pressure modulator capable of rapidly responding to excessive wheel slip or excessive rate of wheel retardation.

It a further object to provide a anti-skid hydraulic fluid pressure modulation valve adaptable for installation between the master cylinder and actuated cylinder of a wide variety of hydraulic brake systems.

It is a still further object to provide a fluid pressure modulation valve requiring a smaller magnitude of mechanical force as the input control than is known in related prior art devices.

It is a still further object to provide a fluid pressure modulation of the above type adaptable for use over a wide range of physical dimensions.

The above and yet other objects and advantages of the present invention will become apparent from the hereinafter set forth detail Description of the Invention, the Drawings, and Claims appended herewith.

DETAILED DESCRIPTION OF THE INVENTION

Figure 1:
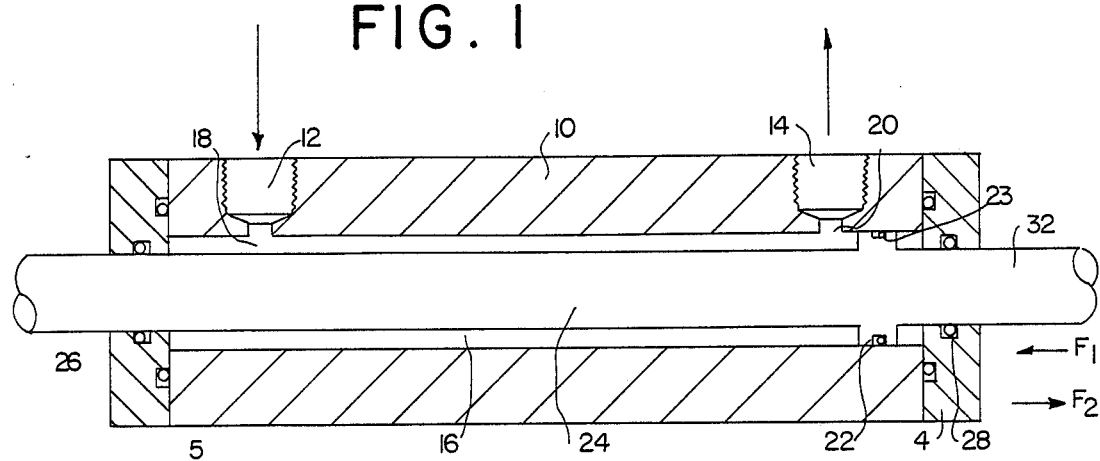
FIG. 1 is an axial cross-sectional schematic view of the inventive valve showing the piston in an unactuated position.
Figure 2:
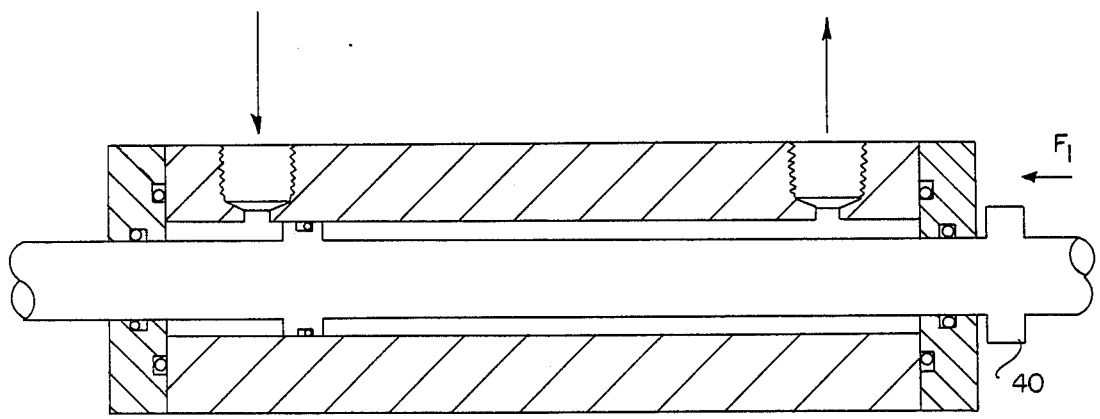
FIG. 2 is an axial cross-sectional schematic view of the inventive valve showing the piston in an actuated position.

With reference to FIG. 1, the instant fluid pressure modulation valve is seen to include a housing 10 having a fluid inlet port 12 which is adapted to receive a fluid force input from the master cylinder; an outlet port 14 which is adapted to apply a fluid force output to an actuated cylinder of the individual brakes of an automobile; and an axial channel 16 which is in communication with said inlet port 12 and said outlet port 14 through radial inward apertured end 18 of said inlet port and radial inward apertured end 20 of said outlet port. Said axial channel 16 is in the nature of an elongated cylinder within which a piston 22 is radially centered as is piston seal 23. Movement of piston 22 is accomplished through an integral radially centered (relative to said piston) rod 24. As may be noted from FIG. 1, said piston 22 is slideably mounted within said axial channel 16 and, typically, said piston 22 and piston rod 24 will have an axial range of travel extending from a region downstream of said apertured end 20 (this being the position shown in FIG. 1) to that of a second position which is upstream of said apertured end 20 of the outlet port 14 (this being the position illustrated in FIG. 2) and is downstream of the inlet port 12. The two limit positions shown in FIG. 2 are accomplished via the use of mechanical stops 40 on piston rod 31, or by hydraulic means.

It is, in the figures, to be further noted that said piston rod 24 is fluidly sealed, through the use of upstream seal 26 and downstream seal 28, to insure the fluid-tight integrity of channel 16. Such integrity is of course necessary in that hydraulic fluid will move between ports 12 and 14 in the course of normal operation of a hydraulic braking system.

With further reference of the figures, it is to be noted that a portion 30 of rod 24 extends beyond upstream fluid seal 26 (and beyond downstream seal 28) into rigid securement with what, in the preferred embodiment, is a linear reciprocating motor to achieve a modulating force for pressure modulation. Alternatively, a radially electric motor may also be used to effect the means for selective reciprocating of said piston rod 24.

Figure 3:
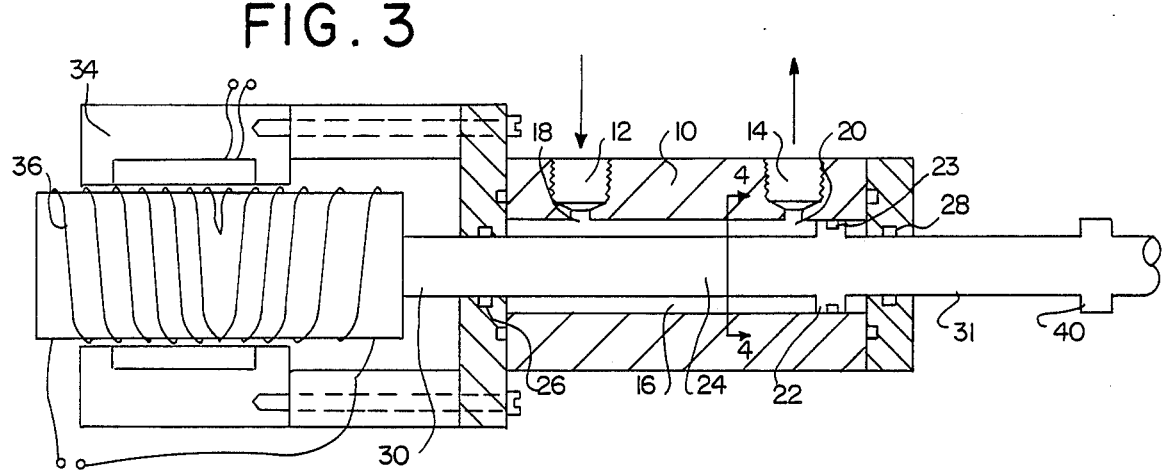
FIG. 3 is an axial cross-sectional schematic view of the inventive valve showing the piston is an unactuated position, also showing the associated linear motor.

As may be appreciated (See FIG. 3) the linear motor 34, or any means equivalent thereto, may, in the context of the present invention, be actuated by an electrical input containing control information relative to wheel speed, wheel braking force, and fluid pressure at the master cylinder. Accordingly, in the contemplated embodiment, a counter-operated control algorithm will generate servoloop control signals to the coil 36 of linear motor 34 to thereby cause a movement of the linear motor armature and, thereby, rod 24 in a direction which is upstream in the present description of the modulation valve. That is, linear motor 34, upon actuation, will move rod 24 and associated piston 22 from the position of FIG. 1 to the direction represented by the piston position of FIG. 2. Accordingly, as is above noted, FIGS. 1 and 2 represent, in enlarged view, the limit positions of the piston.

In a non-actuated condition corresponding to that shown in FIG. 1, hydraulic fluid will flow in a normal fashion from inlet port 12 through the annular geometry of axial channel 16, and into outlet port 14, as pressure is applied from the master cylinder to the actuation cylinders in the respective wheels of the automobile. However, when a reduction in the braking force applied to the wheels is desired, the control signal will cause the coils 36 of motor 34 to impart an upstream direction movement to rod 24 and piston 28 thereby moving piston 28. When the piston passes apertured end 20 thereby interrupting the normal fluid flow path, further force and movement of the piston will oppose the applied fluid force and allow for fluid displacement. This will cause a resultant decrease in fluid pressure available to outlet port 14 thereby reducing the force which can be applied to the actuating cylinders and thereby to the respective brakes of the vehicle. Accordingly, a means for conversion of an electric signal into a fluid-mechanical output is achieved. In the event that further reduction in output force is required, the piston 22 may be advanced upstream as far as, or past, aperture 20 to the position shown in FIG. 2. At this position, piston 22 will directly oppose all fluid-transmitted force applied from inlet port 12 through the axial channel 16 thereby reducing to zero the hydraulic pressure at the outlet port 14. Whether or not such is the case will be governed by design considerations with reference to the anti-locking brake system to be designed.

Figure 4:
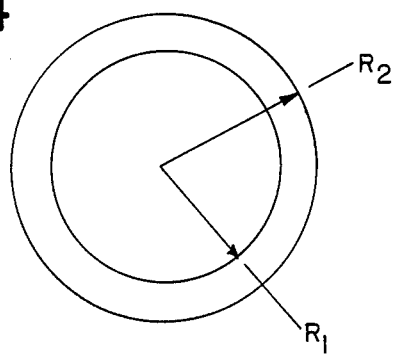
FIG. 4 is a radial cross-sectional view taken along line 4—4 of FIG. 3.

A further, and important, design consideration in the implementation of the present invention is that of determining the effective piston area of the valve by selecting R1 and R2 (See FIG. 4 which is a cross-sectional view of the channel). As shown in FIG. 4 the effective force area is controlled by the selection of R1 and R2 where the effective area equals $\pi(R_2^2-R_1^2)$. The effective area is an import design parameter since it determines the amount of mechanical force required to produce a given amount of fluid pressure to oppose the applied input fluid pressure from the master cylinder. It is noted that fluid pressure equals mechanical force divided by effective area. Therefore the smaller the area the less the force that is required to produce a given fluid pressure. The length of travel will however increase with decreasing area.

In the prior art, such flexibility in regard to the radius of the piston relative to the piston rod is not available. Consequently in such prior art as is represented by Van House, discussed in the Background of the Invention above, it is necessary to apply a relatively large force over a small distance. In distinction, in the present structure, the use of a linear reciprocating motor, or a equivalent mechanical means, in combination with the other elements of the invention, will permit appropriate control of the output force to be achieved through the use of much smaller input force, however, applied over a longer distance. The flexibility of trading force for distance of reciprocation of the rod 24 represents a valuable design option. For example, the requirement for a large reciprocating force in the structure of Van House creates a corresponding requirement for a larger physical structure, this being the fluid motor of Van House and its related vacuum source. In the absence of of the availability of such a source of large reciprocating force, the structure of Van House cannot provide a sufficiently strong output force to be practical in many applications.

In the inventive design set forth herein, the requirement for such a large input force is relaxed. By virtue of the larger length of the stroke which is possible in the present design, both the input force and diameter modulation valve which is particularly practical as a component of an anti-locking hydraulic brake system.

By varying thereat of the radius (R2) of piston 22 to the radius (R1) of rod 24 the magnitude of the mechanical force required to achieve a given reduction in the force or pressure output of outlet port 14 may be achieved. It is, therefore, to be understood that the present invention affords the option of varying one or more of the radius of the piston, the radius of the rod, and the length of travel of the piston, in designing a system which will conveniently fit into the environment of the available hydraulic brake system.

Figure 5:
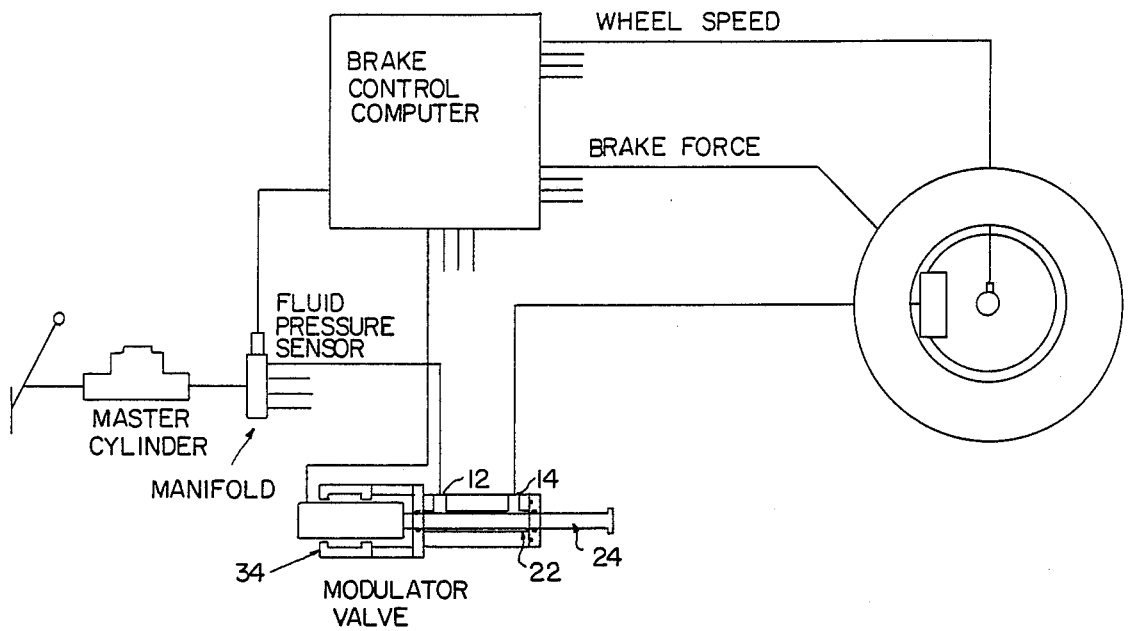
FIG. 5 is an overall view of the brake system.

A further and most important advantage of the present intention is that a very high response time, of at least an order of magnitude greater than that of the fluid motor system of the prior art, which is achieved by the present design. Accordingly, the inventive modulating valve is able to respond to electronic signals, to thereby produce resultant hydraulic changes, in a manner not achievable in the prior art. Thereby, the use of a true computer-controlled braking system with one of the present inventive cylinder and the wheel actuation cylinder, can become a reality, making possible a truly optimum control of wheel speed, wheel braking force and fluid pressure at the master cylinder. FIG. 5 shows the modulator valve of the present invention including a port 12 connected to a master cylinder 50 through a manifold 60 and a port 14 connected to a brake device of a wheel 51. The modulator valve is responsive to an external control signal of a brake control computer 52, which signal is derived from speed signal received through electrical line(s) 53, brake force signal received through electrical line(s) 54 and fluid pressure signal received through an electrical line 55.

The present design is also far simpler to manufacture than is the case in prior art, anti-locking braking systems.

Accordingly, while there has been herein shown and described the preferred embodiment of the present invention, it is to be understood that the invention may be enbodied otherwise than is herein illustrated and described and that, in said embodiment, certain changes in the detail of construction, and in the form and arrangement of parts may be made without departing the underlying ideas or principles of this invention within the scope of the appended claims.

Having thus described my invention what I claim as new, useful and non-obvious and, accordingly, secure by Letters Patent of the United States is:

1. A fluid pressure modulation valve, comprising:
   (a) a housing having a fluid inlet port adapted to receive a force having a related pressure Pi; a fluid outlet port adapted for a force output having a related pressure Po; and an axial channel in fluid communication with radially inwardly apertured ends of said inlet and outlet ports, said axial channel having a radius R2;
   (b) a piston, having a radius R2, radially centered about an integral with a piston rod, said piston rod having a radius R1, said piston slidably mounted in said axial channel, said piston rod having an axial range of travel extending from downstream of said apertured end of said outlet port to upstream of said apertured end of said outlet port, said piston rod being fluidly sealed within said axial channel at the upstream and downstream ends thereof;
   (c) a fluid disposed in fluid tight communication between said inlet and outlet ports and said axial channel therebetween; and
   (d) a selective reciprocating means including a linear motor for selectively reciprocating with a particular force F1 applied to said upstream end of said piston rod, said selective reciprocating means being responsive to external control signals, said piston rod radius R1 and said axial channel radius R2 are selected to substantially match said force F1 in accordance with the formula:

$$F1 = (Pi - Po)[(R2^2 - R1^2)]$$

in which (Pi−Po) is the difference between said inlet port pressure and outlet port pressure,
whereby upstream movement of said piston by said linear motor will co-act with said fluid to diminish the volume of said fluid available to said inlet port, and will increase the volume of fluid available to said outlet port and, further whereby, said linear motor will act to directly oppose fluidly transmitted force applied from said inlet port through said axial channel, said effects acting to reduce the fluid pressure and resultant force at said outlet port.

2. The valve as recited in claim 1, further comprising: an automobile braking system having a hydraulic pressure line into which said fluid pressure modulation valve is placed.

3. The valve as recited in claim 2 in which said fluid disposed in said ports and axial channel comprises hydraulic liquid.

4. The valve as recited in claim 2, wherein said control signals are derivative of information relative to the automobile wheel speed, wheel braking force, and hydraulic pressure at the master cylinder.

* * * * *